United States Patent
Davis et al.

(10) Patent No.: US 11,371,632 B2
(45) Date of Patent: Jun. 28, 2022

(54) COMPLIANT JUMPER TUBE FITTING

(71) Applicant: UNITED TECHNOLOGIES CORPORATION, Farmington, CT (US)

(72) Inventors: Todd A. Davis, Tolland, CT (US); Brad E. Fiore, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 233 days.

(21) Appl. No.: 16/521,122

(22) Filed: Jul. 24, 2019

(65) Prior Publication Data

US 2021/0025527 A1 Jan. 28, 2021

(51) Int. Cl.
*F16L 27/02* (2006.01)
*F01D 9/06* (2006.01)
*F02C 7/06* (2006.01)

(52) U.S. Cl.
CPC ............... *F16L 27/02* (2013.01); *F01D 9/06* (2013.01); *F02C 7/06* (2013.01); *F05D 2240/55* (2013.01); *F05D 2260/60* (2013.01); *F05D 2260/98* (2013.01)

(58) Field of Classification Search
CPC .................................. F16L 27/02; F01D 9/06
See application file for complete search history.

(56) References Cited

U.S. PATENT DOCUMENTS

| | | | |
|---|---|---|---|
| 3,997,197 A | 12/1976 | Marsh et al. | |
| 4,850,794 A * | 7/1989 | Reynolds, Jr. | F01D 9/06 415/136 |
| 5,149,147 A | 9/1992 | Kastrup et al. | |
| 6,305,426 B1 | 10/2001 | Sato et al. | |
| 6,709,023 B2 * | 3/2004 | French | F16L 27/06 285/223 |
| 9,249,685 B2 | 2/2016 | Coffin | |
| 9,410,447 B2 | 8/2016 | Coffin et al. | |
| 9,506,587 B2 * | 11/2016 | Petit | B64D 37/005 |
| 10,001,231 B2 * | 6/2018 | Eilert | F16L 21/08 |
| 10,087,847 B2 | 10/2018 | Szymanski | |
| 2009/0079186 A1 | 3/2009 | Frost et al. | |
| 2016/0138741 A1 | 5/2016 | Eilert et al. | |

(Continued)

FOREIGN PATENT DOCUMENTS

GB 899964 6/1962

OTHER PUBLICATIONS

European Patent Office, European Search Report dated Dec. 7, 2020 in Application No. 20187273.6.

*Primary Examiner* — Michael L Sehn
(74) *Attorney, Agent, or Firm* — Snell & Wilmer L.L.P.

(57) ABSTRACT

A compliant jumper tube fitting assembly may comprise an outer housing comprising a first annular cylindrical structure including a first opening defined by a base wall, and an inner housing comprising a second annular cylindrical structure including a second opening defined by an annular wall, wherein the inner housing is configured to generate a seal between an inner diameter wall of the outer housing and an outer diameter wall of the inner housing in response to inserting the inner housing into a mouth end of the outer housing, wherein the inner housing is configured to receive an end fitting and generate a seal between an inner diameter wall of the inner housing in response to inserting the end fitting into the inner housing.

18 Claims, 7 Drawing Sheets

(56) References Cited

U.S. PATENT DOCUMENTS

| | | |
|---|---|---|
| 2017/0254456 A1 | 9/2017 | Pearse et al. |
| 2018/0223682 A1 | 8/2018 | Hendrickson |
| 2018/0223734 A1 | 8/2018 | Hendrickson |
| 2018/0363913 A1 | 12/2018 | Bouchard et al. |

\* cited by examiner

COMPLIANT JUMPER TUBE FITTING

FIELD

The disclosure relates generally to protective structures for aircraft components, and particularly to fittings for gas turbine engine components.

BACKGROUND

Aircraft components such as cable assemblies, duct work, and turbine engine accessories may be coupled to various structures which transmit fluids therebetween. In various instances, conduits may be used to transmit the fluids and the various structures may have a misalignment or offset from a true position. Misalignment and/or offset from the true position tends to inhibit coupling between conduits. Moreover, the problem may be compounded where space is constrained such as, for example, within a turbine engine case.

SUMMARY

In various embodiments the present disclosure provides a compliant jumper tube fitting assembly comprising an outer housing comprising a first annular cylindrical structure including a first opening defined by a base wall, and an inner housing comprising a second annular cylindrical structure including a second opening defined by an annular wall, wherein the inner housing is configured to generate a seal between an inner diameter wall of the outer housing and an outer diameter wall of the inner housing in response to inserting the inner housing into a mouth end of the outer housing, wherein the inner housing is configured to receive an end fitting and generate a seal between an inner diameter wall of the inner housing in response to inserting the end fitting into the inner housing, and wherein a fluid communication between the first opening, the second opening, and the end fitting is enabled in response to inserting the end fitting into the inner housing.

In various embodiments, the inner diameter wall of the outer housing defines a first bore diameter extending from the base wall toward the mouth end and includes a transition portion, wherein the first bore diameter increases toward a second bore diameter greater than the first bore diameter along the transition portion. In various embodiments, the transition portion is located proximate the mouth end. In various embodiments, the outer housing includes a retaining assembly configured to inhibit the inner housing from translating relatively outward of the mouth end. In various embodiments, the outer diameter wall of the inner housing comprises a first seal channel proximate the annular wall. In various embodiments, the outer diameter wall includes a first arcuate transition portion and a second arcuate transition portion. In various embodiments, the first seal channel is disposed relatively between the first arcuate transition portion and the second arcuate transition portion, and wherein a first seal member is disposed within the first seal channel. In various embodiments, the outer diameter wall of the inner housing comprises a second seal channel distal of the annular wall, wherein a first seal member is disposed within the first seal channel and a second seal member is disposed within the second seal channel.

In various embodiments, the present disclosure provides a gas turbine engine, comprising a compressor section configured to compress a gas, a combustor section aft of the compressor section and configured to combust the gas, a turbine section aft of the combustor section and configured to extract work from the gas, and a compliant jumper tube fitting assembly comprising an outer housing comprising a first annular cylindrical structure including a first opening defined by a base wall, and an inner housing comprising a second annular cylindrical structure including a second opening defined by an annular wall, wherein the inner housing is configured to generate a seal between an inner diameter wall of the outer housing and an outer diameter wall of the inner housing in response to inserting the inner housing into a mouth end of the outer housing, wherein the inner housing is configured to receive an end fitting and generate a seal between an inner diameter wall of the inner housing in response to inserting the end fitting into the inner housing, and wherein a fluid communication between the first opening, the second opening, and the end fitting is enabled in response to inserting the end fitting into the inner housing.

In various embodiments, the inner diameter wall of the outer housing defines a first bore diameter extending from the base wall toward the mouth end and includes a transition portion, wherein the first bore diameter increases toward a second bore diameter greater than the first bore diameter along the transition portion. In various embodiments, the transition portion is located proximate the mouth end. In various embodiments, the outer housing includes a retaining assembly configured to inhibit the inner housing from translating relatively outward of the mouth end. In various embodiments, the outer diameter wall of the inner housing comprises a first seal channel proximate the annular wall. In various embodiments, the outer diameter wall includes a first arcuate transition portion and a second arcuate transition portion. In various embodiments, the first seal channel is disposed relatively between the first arcuate transition portion and the second arcuate transition portion, and wherein a first seal member is disposed within the first seal channel. In various embodiments, the outer diameter wall of the inner housing comprises a second seal channel distal of the annular wall, wherein a first seal member is disposed within the first seal channel and a second seal member is disposed within the second seal channel.

In various embodiments, the present disclosure provides an article of manufacture including a compliant jumper tube fitting assembly comprising an outer housing comprising a first annular cylindrical structure including a first opening defined by a base wall, and an inner housing comprising a second annular cylindrical structure including a second opening defined by an annular wall, wherein the inner housing is configured to generate a seal between an inner diameter wall of the outer housing and an outer diameter wall of the inner housing in response to inserting the inner housing into a mouth end of the outer housing, wherein the inner housing is configured to receive an end fitting and generate a seal between an inner diameter wall of the inner housing in response to inserting the end fitting into the inner housing, and wherein a fluid communication between the first opening, the second opening, and the end fitting is enabled in response to inserting the end fitting into the inner housing.

In various embodiments, the inner diameter wall of the outer housing defines a first bore diameter extending from the base wall toward the mouth end and includes a transition portion, wherein the first bore diameter increases toward a second bore diameter greater than the first bore diameter along the transition portion, wherein the transition portion is located proximate the mouth end, and wherein the outer diameter wall of the inner housing comprises a first seal channel proximate the annular wall. In various embodiments, the outer diameter wall includes a first arcuate transition portion and a second arcuate transition portion, wherein the first seal channel is disposed relatively between the first arcuate transition portion and the second arcuate transition portion, and wherein a first seal member is disposed within the first seal channel. In various embodiments, the outer diameter wall of the inner housing comprises a second seal channel distal of the annular wall, wherein a first seal member is disposed within the first seal channel and a second seal member is disposed within the second seal channel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
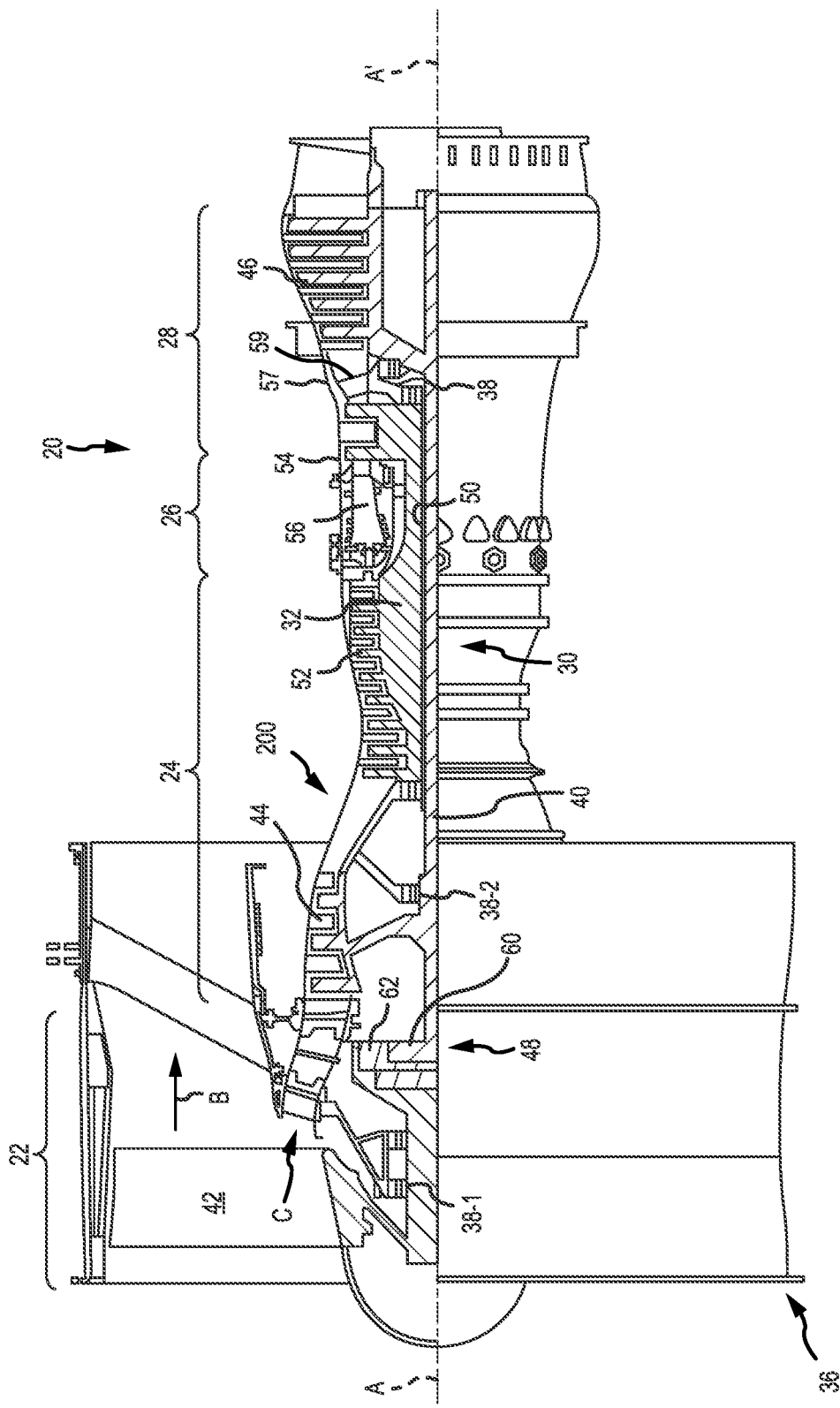
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, low-bypass turbofans, high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to as a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
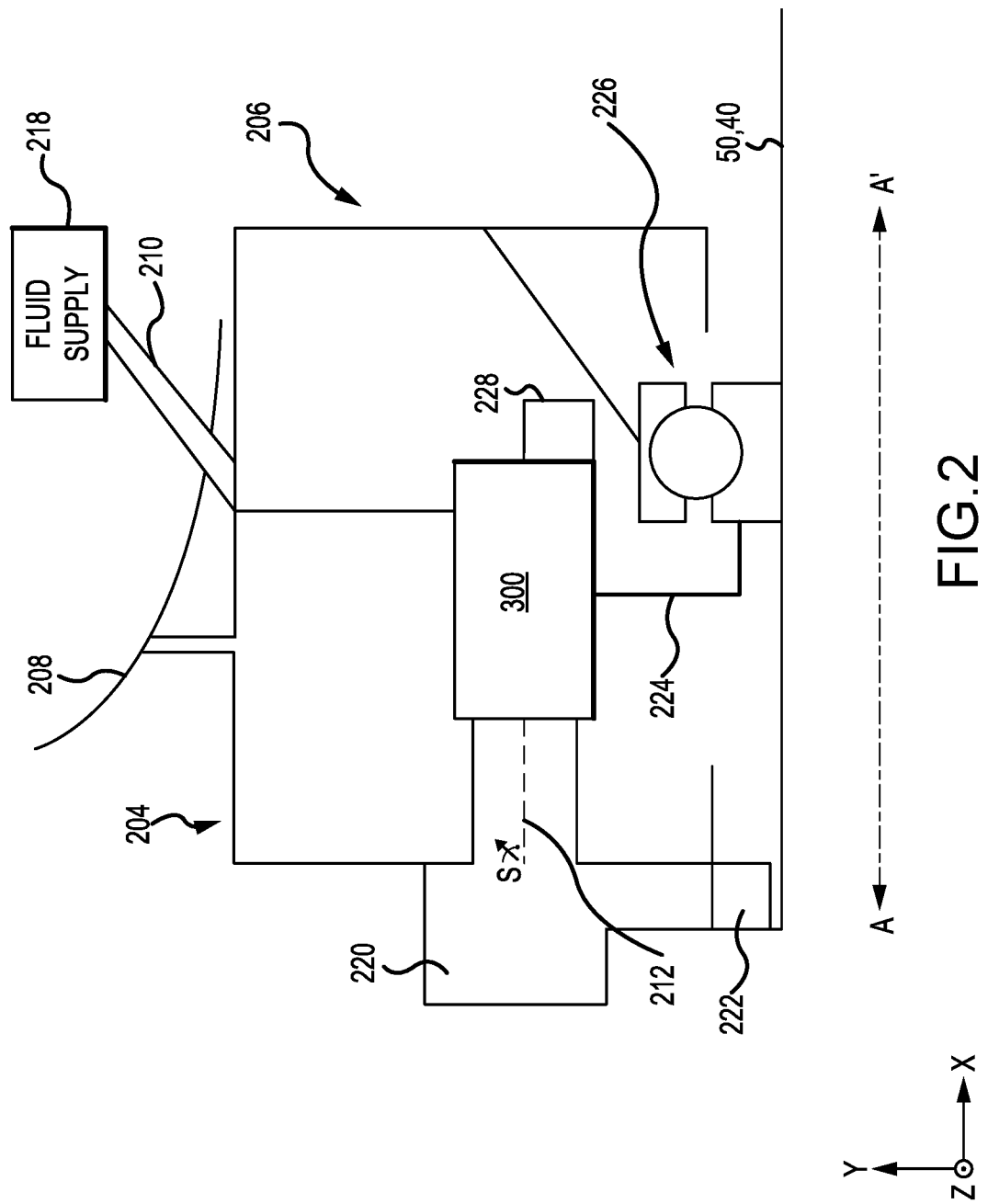
FIG. 2 illustrates a bearing compartment of a gas turbine engine, in accordance with various embodiments.

According to various embodiments and with reference to FIGS. 1 and 2, a bearing compartment 200 including compliant jumper tube fitting assemblies 300 (i.e., compliant jumper tube fitting) is shown in cross section along the rotational axis A-A' of gas turbine engine 20. XY-axes are provided for reference with the X-axis parallel the engine central longitudinal axis A-A. The compliant jumper tube fittings 300 are coupled between a forward case structure 204 and an aft case structure 206 and lie relatively radially (along the Y-axis) inward of an aerodynamic outer case 208. In various embodiments, a first conduit 210 is in fluid communication with a fluid supply 218. The fluid supply may provide a fluid such as, for example, oil, water, gas, and/or the like to various components and modules of the gas turbine engine 20. The first conduit 210 may supply the fluid to the compliant jumper tube fittings 300 which communicate the fluid relatively between the forward case structure 204 and the aft case structure 206. In various embodiments, a first compliant jumper tube fitting 300 may be in fluid communication with a plenum 220 and supply a gas flow to purge a knife edge seal 222. In various embodiments, a second compliant jumper tube fitting 300 may be in fluid communication with at least one of a distribution manifold 228 and/or a second conduit 224. The second compliant jumper tube fitting 300 may supply an oil flow to lubricate a bearing module 226. In various embodiments, the second compliant jumper tube fitting 300 may be coupled to the bearing module 226.

In various embodiments, the compliant jumper tube fittings 300 are configured to maintain the fluid communication over a range of a radial misalignment (i.e. along the Y-axis) relatively between the forward case structure 204 and the aft case structure 206. In various embodiments, at a true position the radial misalignment may be 0 mm. The compliant jumper tube fittings 300 may maintain the fluid communication where the radial misalignment is between ±0.100 in [2.54 mm]. In various embodiments and in like regard, the compliant jumper tube fittings 300 are configured to maintain the fluid communication over a range of an axial misalignment (i.e., along the X-axis) relatively between the forward case structure 204 and the aft case structure 206. In various embodiments, at the true position the axial misalignment may be 0 mm. The jumper tube fittings 300 may maintain the fluid communication where the axial misalignment is between ±0.100 in [2.54 mm].

In various embodiments, the compliant jumper tube fittings 300 are configured to maintain the fluid communication over a range of a slope misalignment relatively between either of the forward case structure 204 and/or aft case structure 206 and a fitting centerline 212. The slope misalignment may be defined by an angle S away (e.g., positive or negative) from a perpendicular to the fitting centerline 212. Stated another way, the fitting centerline 212 may be perpendicular to a plane defined by an orifice (e.g., orifice of forward case structure 204) in fluid communication with the jumper tube fittings 300 in the true position. In this regard, the angle S may be defined by the deviation of the fitting centerline 212 away from the true position. In various embodiments, the jumper tube fittings 300 may maintain the fluid communication where the angle S is between 0.5° and 3°.

Figure 3A:
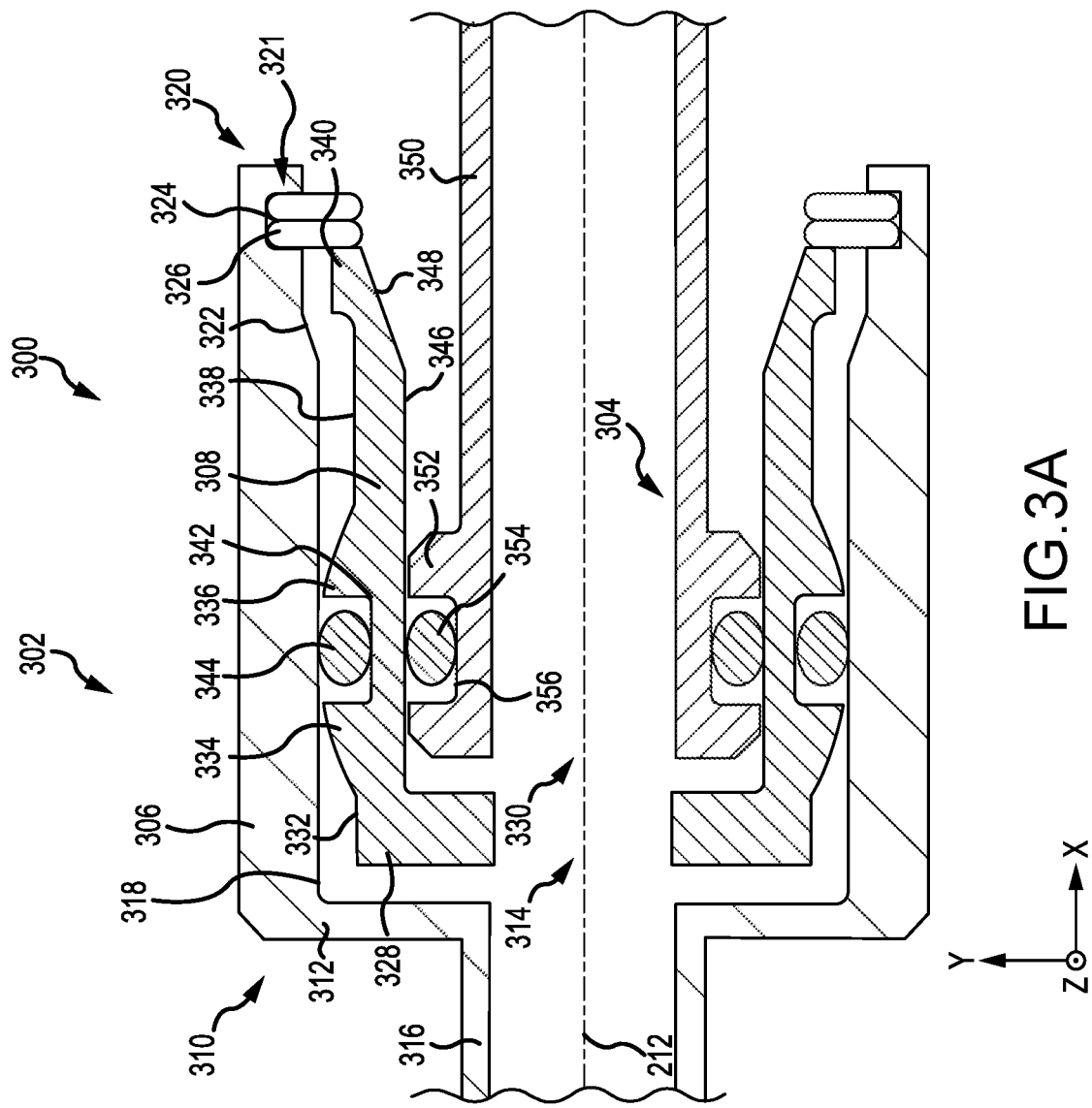
FIG. 3A illustrates a compliant jumper tube fitting assembly, in accordance with various embodiments
Figure 3B:
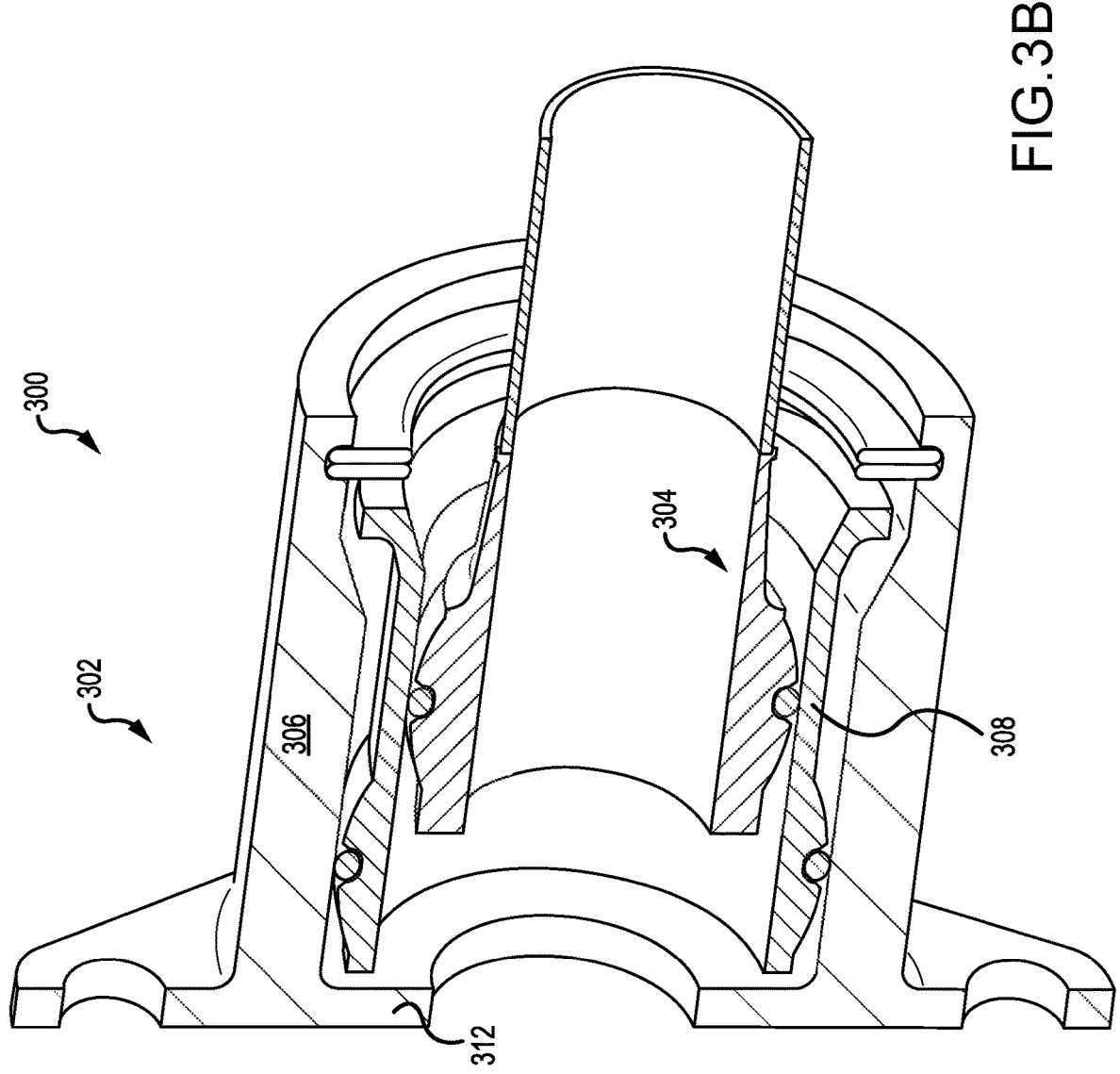
FIG. 3B illustrates a perspective cross section of a compliant jumper tube fitting assembly, in accordance with various embodiments.
Figure 3C:
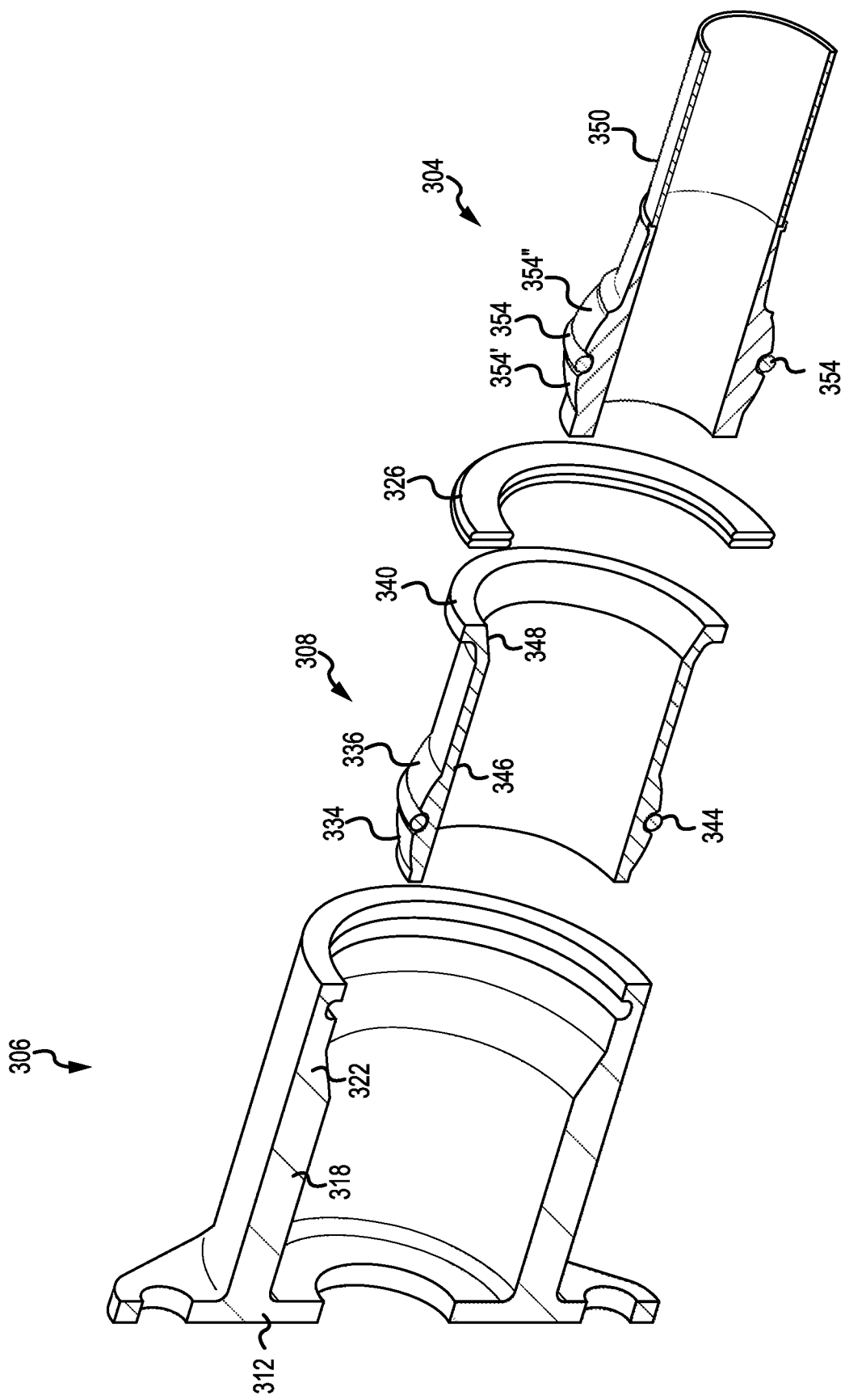
FIG. 3C illustrates an exploded view of a compliant jumper tube fitting assembly, in accordance with various embodiments.

In various embodiments and with additional reference to FIGS. 3A, 3B, and 3C, a compliant jumper tube fitting 300 is illustrated in cross section along the fitting centerline 212. The compliant jumper tube fitting 300 comprises a housing assembly 302 and an end fitting 304. The housing assembly 302 comprises an outer housing 306 and an inner housing 308. The outer housing 306 comprise a first annular cylindrical structure extending symmetrically about the fitting centerline 212. The first annular cylindrical structure is closed at a base end 310 by base wall 312. The base wall 312 defines a first opening 314 which may be configured to pass the fluid therethrough. In various embodiments, the first opening 314 may be centered about the fitting centerline 212 or may be disposed at any suitable location on the base wall 312. In various embodiments, a passage 316 may be coupled to the first opening 314 and thereby configured to receive the fluid through the first opening 314.

An inner diameter wall 318 of the outer housing 306 defines a first bore diameter extending (along the X-axis) from the base wall 312 toward the mouth end 320 of the outer housing 306. The inner diameter wall 318 includes a transition portion 322 proximate the mouth end 320. Wherein the first bore diameter increases along the transition portion 322 toward a second bore diameter greater than the first bore diameter. In various embodiments, the ratio of the second bore diameter to the first bore diameter may be between 2:1 to 1.1:1. The outer housing 306 comprises a retaining assembly 321 configured to inhibit the inner housing 308 from translating relatively outward of the mouth end 320. In various embodiments, a locking channel 324 may be cut into the second bore diameter proximate the mouth end 320 and between the transition portion 322 and the mouth end 320. The locking channel 324 may be configured to retain one or more lock rings 326. The lock rings 326 may protrude relatively inward of the second bore diameter and contact the inner housing 308 in response to an axial translation (along the X-axis) of the inner housing 308 with respect to the outer housing 306. In this regard, the locking rings 326 tend to inhibit the inner housing 308 from translating relatively outward of the mouth end 320.

In various embodiments, the inner housing 308 comprises a second annular cylindrical structure extending symmetrically about the fitting centerline 212. The second annular cylindrical structure is closed by an annular wall 328 defining a second opening 330 therethrough. In various embodiments, the second opening 330 may be centered about the fitting centerline 212. In various embodiments, the second opening 330 may be defined by the first opening 314 such that a ratio between the cross-sectional area of the first opening 314 and the cross-sectional area of second opening 330 is 1:1 or may be 1:2, or may be 2:1.

The second annular cylindrical structure of the inner housing 308 includes an outer diameter wall 332 including a first arcuate transition portion 334 and a second arcuate transition portion 336. The first arcuate transition portion 334 lies relatively forward of an proximate the annular wall 328. The outer diameter wall increases (along the X-axis) from a first outer diameter to a second outer diameter, greater than the first outer diameter, as defined by the surface of the first arcuate transition portion 334. The second arcuate transition portion 336 lies relatively forward (along the X-axis) of the first arcuate transition portion 334. The outer diameter wall 332 decreases (along the X-axis) from the second outer diameter to the first outer diameter as defined by the surface of the second arcuate transition portion 336. In various embodiments, the ratio of the second outer diameter to the first outer diameter may be between 1.05:1 and 1.2:1. A constant diameter portion 338 extends, at the first outer diameter, forward (along the X-axis) of the second arcuate transition portion 336 toward a stepped end portion 340. In various embodiments, the stepped end portion 340 of the outer diameter wall 332 may comprise an intermediate outer diameter greater than the first outer diameter but less than the second outer diameter. The stepped end portion 340 defines a distal end of the second annular cylindrical structure from the annular wall 328.

Figure 3D:
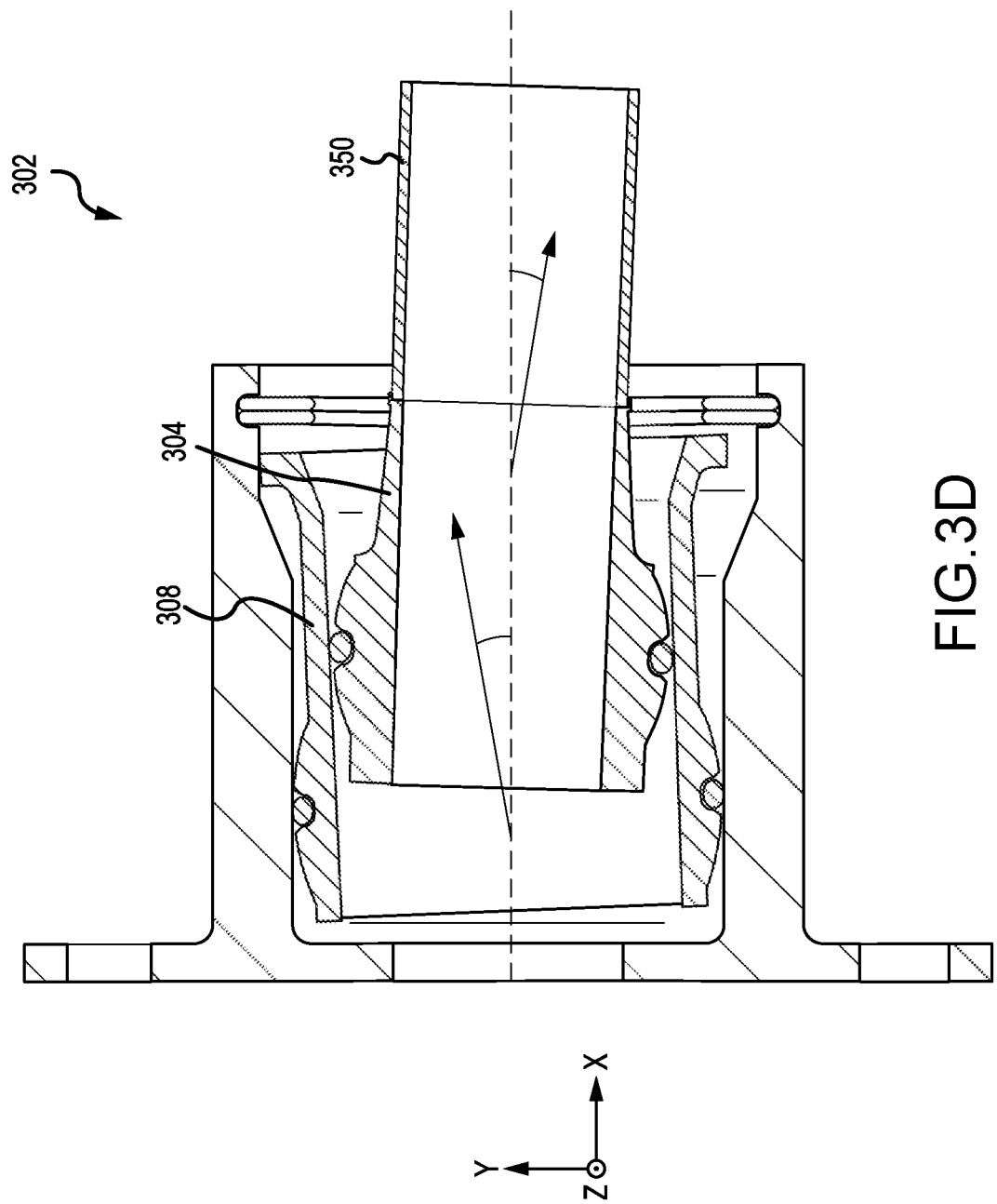
FIG. 3D illustrates compliant jumper tube fitting assembly in a misaligned condition, in accordance with various embodiments.

In various embodiments, a first seal channel 342 is disposed relatively between the first arcuate transition portion 334 and the second arcuate transition portion 336. A first seal member 344 is disposed within the first seal channel 342 and contacted with the inner diameter wall 318 of the outer housing 306. In various embodiments, a seal member such as first seal member 344 may comprise a resilient material such as, for example, one of rubber, synthetic rubber, silicone, and/or the like. In this regard, the first seal member 344 may deform under a compressive force to fill the first seal channel 342 or may expand elastically in response to the compressive force being removed, tending thereby to maintain contact with each of the first seal channel 342 and the inner diameter wall 318 of the outer housing 306. Thereby, the inner housing 308 may pitch and yaw relative to the fitting centerline 212 about the first arcuate transition portion 334 and the second arcuate transition portion 336. In this regard, the inner housing 308 may tend to maintain fluid communication through the fitting 300 in response to a change in the angle S as illustrated in FIG. 3D.

In various embodiments, the second annular cylindrical structure of the inner housing 308 includes an inner diameter wall 346 defining a third bore diameter extending (along the X-axis) from the annular wall 328 toward the distal end of the inner housing 308. The inner diameter wall 346 includes a flared portion 348 radially (along the Y-axis) inward of the stepped end portion 340 of the outer diameter wall 332. In various embodiments, the third bore diameter increases linearly along the flared portion 348 toward a fourth bore diameter at the distal end of the inner housing 308. In this regard, the fourth bore diameter is greater than the third bore diameter and the flared portion 348 may tend to guide end fitting 304 relatively into the third bore diameter of the inner diameter wall 346. In various embodiments, the ratio of the fourth bore diameter to the third bore diameter may be between 2:1 and 1.2:1.

In various embodiments, an end fitting 304 may be inserted through the flared portion 348 into the third bore diameter of the inner housing 308. The third end fitting may be coupled to a tube 350 (e.g., a third conduit) configured to communicate the fluid to the compliant jumper tube fitting 300. The end fitting 304 may comprise a flanged portion 352 having a seal member 354. In various embodiments, the flanged portion 352 may define a third arcuate transition portion 354' and a fourth arcuate transition portion 354". In various embodiments, the seal member 354 may be retained in a seal channel 356 of the flanged portion 352. In various embodiments and in response to inserting the end fitting 304 into the inner housing 308, the flared portion 348 may compress the seal member 354 into the seal channel 356 and thereby tend to form a seal at the third inner diameter of the inner diameter wall 346. In this regard, the compliant jumper tube fitting 300 may generate a seal and enable a fluid communication between the passage 316 and the tube 350.

Figure 4:
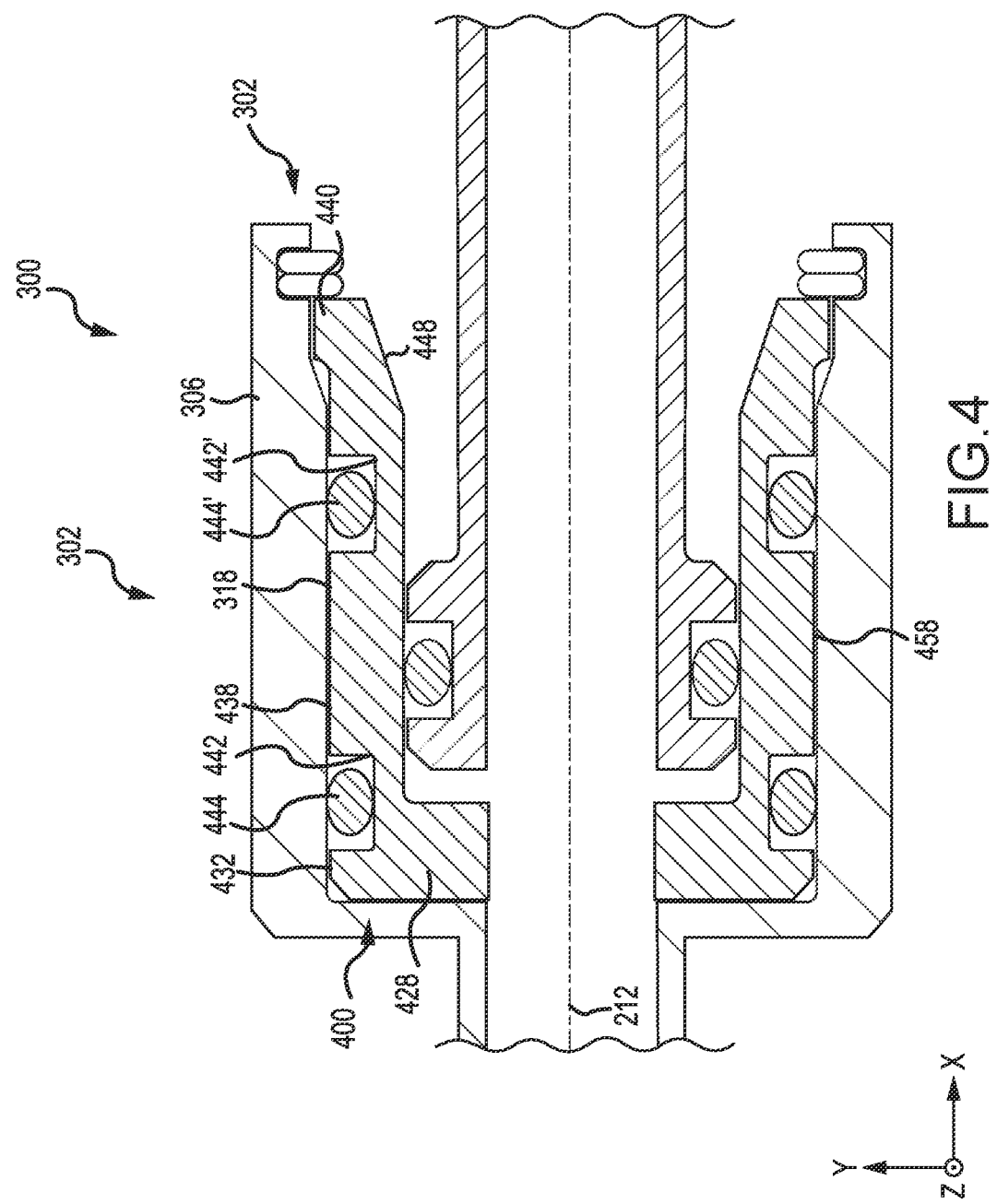
FIG. 4 illustrates a compliant jumper tube fitting assembly, in accordance with various embodiments.

In various embodiments and with additional reference to FIG. 4, compliant jumper tube fitting 300 is shown comprising an inner housing 400. Inner housing 400 comprises features, geometries, construction, manufacturing techniques, and/or internal components similar to inner housing 308. Inner housing 400 comprises a third annular cylindrical structure having an outer diameter wall 432 comprising a constant diameter portion 438. The constant diameter portion 438 extends from the annular wall 428 forward (along the X-axis) to the stepped end portion 440. A first seal channel 442 is set in the outer diameter wall 432 proximate the annular wall 428. A second seal channel 442' is set in the outer diameter wall 432 forward (along the X-axis) of the first seal channel 442 and proximate the stepped end portion 440. In various embodiments, the second seal channel 442' may lie relatedly aft (along the X-axis) of the flared portion 448. A first seal member 444 and a second seal member 444' may be disposed in the respective seal channels (442, 442') and contacted with the inner diameter wall 318 of the outer housing 306. The first seal member 444 and the second seal member 444' may expand within the respective seal channels (442, 442') across a gap 458 between the inner diameter wall 318 of the outer housing 306 and the outer diameter wall 432 of the inner housing 400. In this regard, differential compression of the first seal member 444 and the second seal member 444' may tend to enable the inner housing 400 to pitch and yaw with the gap 458 region relative to the fitting centerline 212. In this regard, the inner housing 400 may tend to maintain fluid communication through the fitting 300 in response to a change in the angle S. In various embodiments, a contact between the stepped end portion 440 and the inner diameter wall 318 tends to limit the pitch and yaw of the inner housing 400.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A compliant jumper tube fitting assembly, comprising:
an outer housing comprising a first annular cylindrical structure including a first opening defined by a base wall;
an inner housing comprising a second annular cylindrical structure including a second opening defined by an annular wall; and
a retaining assembly comprising a lock ring,
wherein the inner housing is configured to generate a seal between an inner diameter wall of the outer housing and an outer diameter wall of the inner housing in response to inserting the inner housing into a mouth end of the outer housing,
wherein the inner housing is configured to receive an end fitting and generate a seal between an inner diameter wall of the inner housing in response to inserting the end fitting into the inner housing,
wherein a fluid communication between the first opening, the second opening, and the end fitting is enabled in response to inserting the end fitting into the inner housing,
wherein the inner housing is enclosed axially between the lock ring and the base wall, and
wherein the outer diameter wall includes a first arcuate transition portion and a second arcuate transition portion.

2. The compliant jumper tube fitting assembly of claim 1, wherein the inner diameter wall of the outer housing defines a first bore diameter extending from the base wall toward the mouth end and includes a transition portion, wherein the first bore diameter increases toward a second bore diameter greater than the first bore diameter along the transition portion.

3. The compliant jumper tube fitting assembly of claim 2, wherein the transition portion is located proximate the mouth end.

4. The compliant jumper tube fitting assembly of claim 3, wherein the outer diameter wall of the inner housing comprises a first seal channel proximate the annular wall.

5. The compliant jumper tube fitting assembly of claim 4, wherein the outer diameter wall of the inner housing comprises a second seal channel distal of the annular wall, wherein a first seal member is disposed within the first seal channel and a second seal member is disposed within the second seal channel.

6. The compliant jumper tube fitting assembly of claim 2, wherein the retaining assembly is configured to inhibit the inner housing from translating relatively outward of the mouth end.

7. The compliant jumper tube fitting assembly of claim 1, wherein the first seal channel is disposed relatively between the first arcuate transition portion and the second arcuate transition portion, and wherein a first seal member is disposed within the first seal channel.

8. A gas turbine engine, comprising:
a compressor section configured to compress a gas;
a combustor section aft of the compressor section and configured to combust the gas;
a turbine section aft of the combustor section and configured to extract work from the gas;
a tube assembly comprising a tube and an end fitting coupled to the tube;
a compliant jumper tube fitting assembly, comprising:
an outer housing comprising a first annular cylindrical structure including a first opening defined by a base wall; and
an inner housing comprising a second annular cylindrical structure including a second opening defined by an annular wall;
wherein the inner housing is configured to generate a seal between an inner diameter wall of the outer housing and an outer diameter wall of the inner housing in response to inserting the inner housing into a mouth end of the outer housing, wherein the outer diameter wall includes a first arcuate transition portion and a second arcuate transition portion, wherein a fluid communication between the first opening, the second opening, and the end fitting is enabled in response to inserting the end fitting into the inner housing, wherein the end fitting of the tube assembly is configured to generate a second seal between an inner diameter wall of the inner housing and an outer diameter wall of the end fitting in response to inserting the end fitting into the inner housing, and wherein the inner housing is configured to pitch and yaw relative to a centerline of the end fitting and maintain fluid communication between the end fitting and the outer housing.

9. The gas turbine engine of claim 8, wherein the inner diameter wall of the outer housing defines a first bore diameter extending from the base wall toward the mouth end and includes a transition portion, wherein the first bore diameter increases toward a second bore diameter greater than the first bore diameter along the transition portion.

10. The gas turbine engine of claim 9, wherein the transition portion is located proximate the mouth end.

11. The gas turbine engine of claim 9, wherein the outer housing includes a retaining assembly comprising a lock ring and configured to inhibit the inner housing from translating relatively outward of the mouth end.

12. The gas turbine engine of claim 10, wherein the outer diameter wall of the inner housing comprises a first seal channel proximate the annular wall.

13. The gas turbine engine of claim 12, wherein the first seal channel is disposed relatively between the first arcuate transition portion and the second arcuate transition portion, and wherein a first seal member is disposed within the first seal channel.

14. The gas turbine engine of claim 12, wherein the outer diameter wall of the inner housing comprises a second seal channel distal of the annular wall, wherein a first seal member is disposed within the first seal channel and a second seal member is disposed within the second seal channel.

15. An article of manufacture including a compliant jumper tube fitting assembly, comprising:
  an outer housing comprising a first annular cylindrical structure including a first opening defined by a base wall;
  an inner housing comprising a second annular cylindrical structure including a second opening defined by an annular wall; and
  a retaining assembly comprising a lock ring,
  wherein the inner housing is configured to generate a seal between an inner diameter wall of the outer housing and an outer diameter wall of the inner housing in response to inserting the inner housing into a mouth end of the outer housing,
  wherein the inner housing is configured to receive an end fitting and generate a seal between an inner diameter wall of the inner housing in response to inserting the end fitting into the inner housing,
  wherein a fluid communication between the first opening, the second opening, and the end fitting is enabled in response to inserting the end fitting into the inner housing,
  wherein the inner housing is disposed axially between the lock ring and the base wall, and
  wherein the outer diameter wall includes a first arcuate transition portion and a second arcuate transition portion.

16. The article of manufacture of claim 15, wherein the inner diameter wall of the outer housing defines a first bore diameter extending from the base wall toward the mouth end and includes a transition portion, wherein the first bore diameter increases toward a second bore diameter greater than the first bore diameter along the transition portion,
  wherein the transition portion is located proximate the mouth end, and
  wherein the outer diameter wall of the inner housing comprises a first seal channel proximate the annular wall.

17. The article of manufacture of claim 16, wherein the first seal channel is disposed relatively between the first arcuate transition portion and the second arcuate transition portion, and wherein a first seal member is disposed within the first seal channel.

18. The article of manufacture of claim 16, wherein the outer diameter wall of the inner housing comprises a second seal channel distal of the annular wall, wherein a first seal member is disposed within the first seal channel and a second seal member is disposed within the second seal channel.

* * * * *